United States Patent [19]

Ohyama et al.

[11] Patent Number: 5,387,686

[45] Date of Patent: Feb. 7, 1995

[54] DYE FOR HEAT-SENSITIVE TRANSFER RECORD AND INK COMPOSITION FOR HEAT-SENSITIVE TRANSFER RECORD

[75] Inventors: Tsukasa Ohyama; Yasushi Shimokawa; Yoriaki Matsuzaki; Keisuke Takuma, all of Fukuoka; Isamu Ghoda; Hitoshi Koshida, both of Hyogo; Ryohei Takiguchi, Chiba; Hiroshi Eguchi; Komei Kafuku, both of Saitama; Masayuki Nakamura, Tokyo, all of Japan

[73] Assignees: Mitsui Toatsu Chemicals, Incorporated; Dai Nippon Printing Co., Ltd., both of Tokyo, Japan

[21] Appl. No.: 166,061

[22] Filed: Dec. 14, 1993

Related U.S. Application Data

[63] Continuation of Ser. No. 924,874, Aug. 5, 1992, Pat. No. 5,296,445.

[30] Foreign Application Priority Data

Aug. 6, 1991 [JP] Japan .................... 3-196631
Dec. 27, 1991 [JP] Japan .................... 3-345869
Dec. 27, 1991 [JP] Japan .................... 3-345870

[51] Int. Cl.$^6$ ........................... C07D 215/227
[52] U.S. Cl. ........................ 546/154; 106/22 H
[58] Field of Search ............... 546/154; 106/22 H

[56] References Cited

U.S. PATENT DOCUMENTS

| | | | |
|---|---|---|---|
| 4,588,517 | 5/1986 | Kaneko et al. | 252/299.1 |
| 4,820,685 | 4/1989 | Murata | 503/227 |
| 5,026,505 | 6/1991 | Kaneko et al. | 252/299.1 |

FOREIGN PATENT DOCUMENTS

| | | |
|---|---|---|
| 0076633 | 4/1983 | European Pat. Off. |
| 0098522 | 1/1984 | European Pat. Off. |
| 2107504 | 9/1971 | Germany |
| 026382 | 3/1974 | Japan |
| 142055 | 11/1980 | Japan |
| 60-53565 | 3/1985 | Japan |
| 63-182192 | 7/1988 | Japan |
| 63-1892889 | 8/1988 | Japan |

OTHER PUBLICATIONS

Patent Abstracts of Japan 63-182192 (1988).
Patent Abstracts of Japan 58-93778(A) (1983).
Patent Abstracts of Japan 63-189289 (1988).
Konishi et al, Chemical Abstracts, vol. 83 (1975) 98460m.

Primary Examiner—Richard L. Raymond
Attorney, Agent, or Firm—Millen, White, Zelano & Branigan

[57] ABSTRACT

A dyestuff for heat-sensitive transfer record is here disclosed which can be represented by the formula (1)

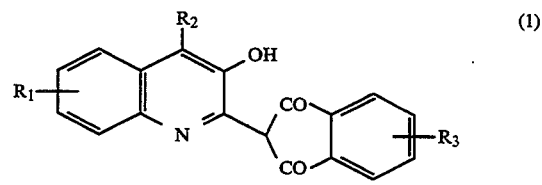

wherein $R_1$ is a hydrogen atom, alkyl group having 1 to 8 carbon atoms or cycloalkyl group; $R_2$ is a hydrogen atom, halogen atom, alkoxy group which may be substituted, alkylthio group which may be substituted or arylthio group which may be substituted; $R_3$ is a branched alkyl group having 3 to 5 carbon atoms, O-substituted oxycarbonyl group, N-substituted aminocarbonyl group in which an N-substituted group may form a ring, or a substituted or unsubstituted heterocyclic ring having two or more atoms of one or more kinds selected from the group consisting of a nitrogen atom, oxygen atom and sulfur atom; and when $R_1$ is a hydrogen atom, $R_3$ is a branched alkyl group having 3 to 5 carbon atoms, or a substituted or unsubstituted heterocyclic ring having two or more atoms of one or more kinds selected from the group consisting of a nitrogen atom, oxygen atom and sulfur atom;

and there are also disclosed an ink for heat-sensitive transfer record and a transfer sheet in which the above-mentioned dyestuff is used.

9 Claims, 2 Drawing Sheets

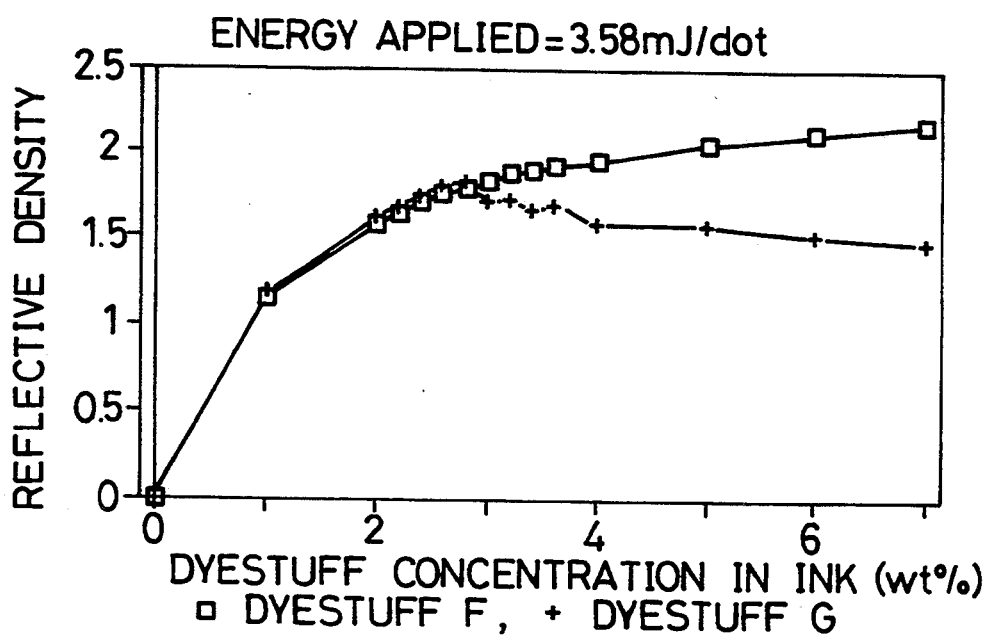
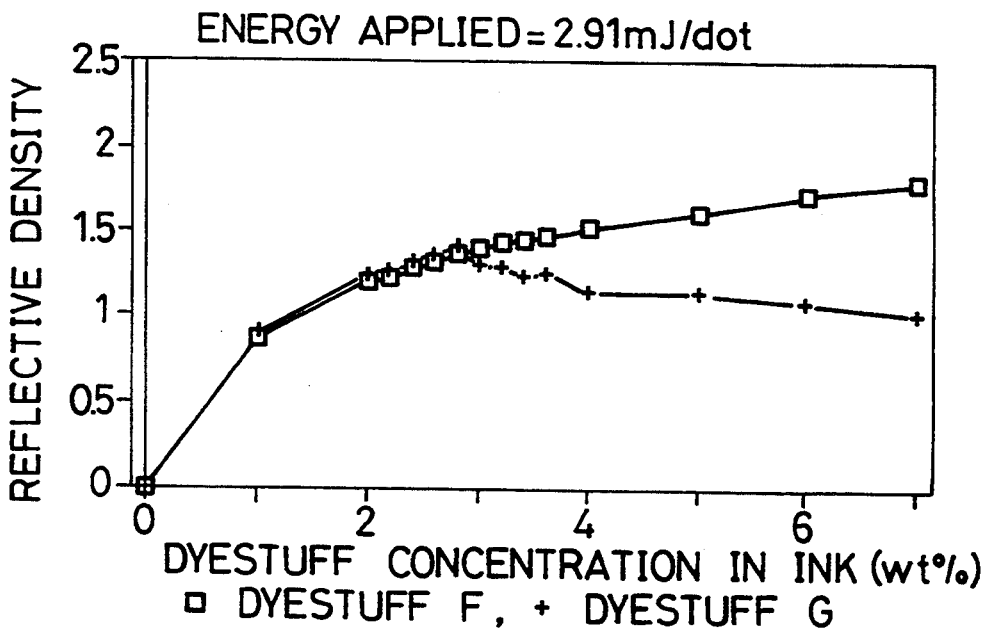

DYE FOR HEAT-SENSITIVE TRANSFER RECORD AND INK COMPOSITION FOR HEAT-SENSITIVE TRANSFER RECORD

This application is a continuation of application Ser. No. 07/924,874, filed Aug. 5, 1992, now U.S. Pat. No. 5,296,446.

BACKGROUND OF THE INVENTION (i) Field of the Invention

The present invention relates to a dyestuff for heat-sensitive transfer record (hereinafter abbreviated to "sublimable dyestuff"), an ink composition for heat-sensitive transfer record and a transfer sheet which can be used in color hard copies and the like utilizing a sublimation heat transfer record system.

(ii) Description of the Prior Art

A heat transfer record system using a sublimable dyestuff is one of the heat transfer print systems which comprise forming a transfer sheet by coating a thin condenser paper or PET film having a thickness of several microns with an ink of a sublimable dyestuff, and then selectively heating the transfer sheet by means of a heat-sensitive head to transfer the dyestuff to a record paper which is a material to be recorded. Nowadays, the heat transfer record system has been used as a means for the image record (hard copy) of much image information.

The sublimable dyestuffs which are used in the present invention are required to have abundant colors and strong adhesive force, and to be excellent in color mixing properties and stability. In the above-mentioned record system, the amount of the dyestuff to be sublimated depends upon heat energy, and so the density of the transferred dyestuff can be analogically controlled. This is a major feature which other printing systems cannot possess.

As yellow sublimable dyestuffs, there are quinophthalone compounds having excellent light resistance and fastness (Japanese Patent Laid-open Nos. 53565/1985, 18928-9/1988 and 182192/1988), but most of these dyestuffs lack for both of a high sublimation speed and the stability of a transferred image. The development of dyestuffs which can meet the optimum requirements of sublimable dyestuffs has been sought.

SUMMARY OF THE INVENTION

The present inventors have intensively investigated to solve the above-mentioned problems, and as a result, have discovered that the sublimation rate of a dyestuff for heat-sensitive transfer record at the time of its transfer is connected with an interaction among the molecules of the dyestuff and another interaction between the molecules of the dyestuff and a binder resin for an ink.

That is, it has been made apparent that the best dyestuff has a good solubility in an ink solvent, a low melting point, and such a small interaction with the binder resin for the ink as not to impair the shelf stability of the dyestuff after the formation of a transfer sheet. Furthermore, it has been found that a compound represented by the formula (1) which will be described hereinafter is suitable for a yellow dyestuff for heat-sensitive transfer record. On the basis of this knowledge, the present invention has been completed.

In consequence, an object of the present invention is to provide a dyestuff for heat-sensitive transfer record, an ink composition for heat-sensitive transfer record and a transfer sheet which have a high sublimation rate and which permit transferring a stable image.

The present invention is directed to a dyestuff for heat-sensitive transfer record which comprises a compound represented by the formula (1)

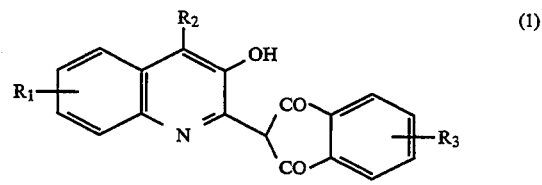

wherein $R_1$ is a hydrogen atom, alkyl group having 1 to 8 carbon atoms or cycloalkyl group; $R_2$ is a hydrogen atom, halogen atom, alkoxy group which may be substituted, alkylthio group which may be substituted or arylthio group which may be substituted; $R_3$ is a branched alkyl group having 3 to 5 carbon atoms, O-substituted oxycarbonyl group, N-substituted aminocarbonyl group in which an N-substituted group may form a ring, or substituted or unsubstituted heterocyclic ring having two or more hetero atoms of one or more kinds selected from the group consisting of a nitrogen atom, oxygen atom and sulfur atom; and when $R_1$ is a hydrogen atom, $R_3$ is a branched alkyl group having 3 to 5 carbon atoms, or substituted or unsubstituted heterocyclic ring having two or more hetero atoms of one or more kinds selected from the group consisting of a nitrogen atom, oxygen atom and sulfur atom.

Furthermore, the compound of the formula (1) can be present as a tautomer represented by the following formula (1'), but this tautomer is also within the category of the present invention:

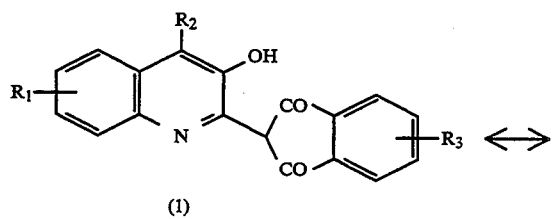
(1)

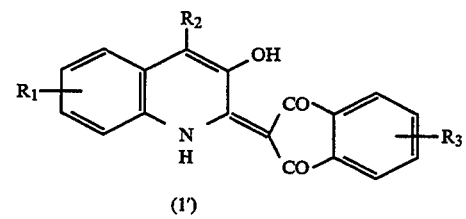
(1')

The present invention is also directed to an ink composition for heat-sensitive transfer record which comprises a dyestuff for heat-sensitive transfer record represented by the formula (1), a binder resin, and an organic solvent and/or water.

Moreover, the present invention is directed to a transfer sheet which comprises a base sheet and a dyestuff-supporting layer formed all over the base sheet, the dyestuff contained in the dyestuff-supporting layer being the above-mentioned dyestuff.

BRIEF DESCRIPTION OF THE DRAWINGS

Each of FIGS. 1, 2 and 3 is a graph showing a relation between a reflective density of a recorded image and a dyestuff concentration in an ink, in the case that transfer record was carried out by applying energies of 3.58, 2.91 and 2.01 mJ/dot by means of a thermal head.

DETAILED DESCRIPTION OF THE INVENTION

Figure 3:
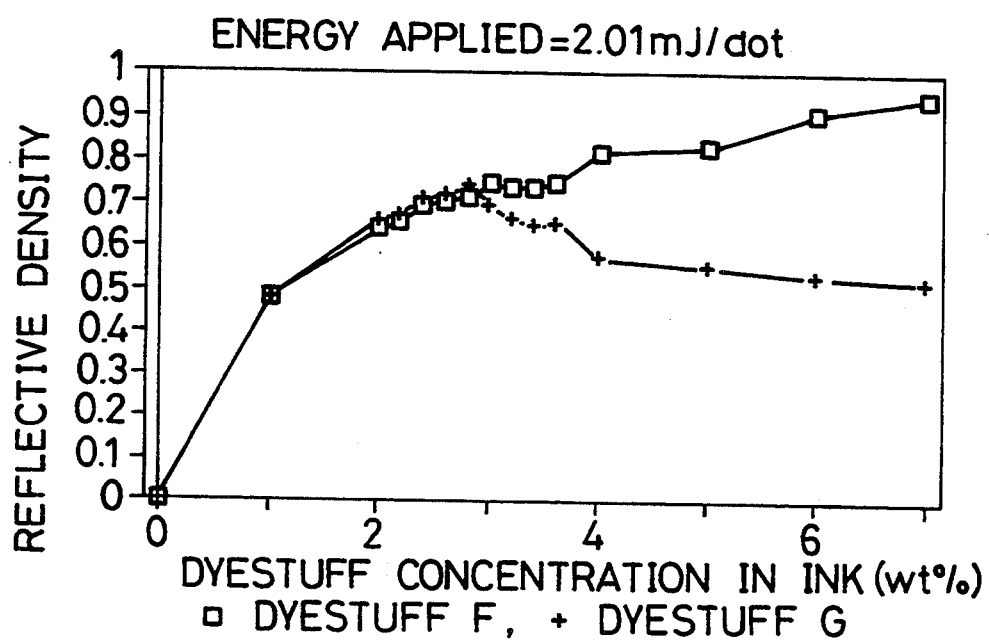

In the present invention, a compound represented by the formula (1) is used as a dyestuff for heat-sensitive transfer record.

$R_1$ in the formula (1) is a hydrogen atom, alkyl group having 1 to 8 carbon atoms or cycloalkyl group.

Typical examples of the alkyl group include methyl, ethyl, n-propyl, iso-propyl, n-butyl, iso-butyl, sec-butyl, tert-butyl, n-pentyl, n-hexyl, n-heptyl and n-octyl groups.

Preferable examples of the cycloalkyl group are those having 5 to 6 carbon atoms, and typical examples thereof include cyclopentyl and cyclohexyl groups.

$R_2$ in the formula (1) is a hydrogen atom, halogen atom, alkoxy group which may be substituted, alkylthio group which may be substituted or arylthio group which may be substituted.

Preferable examples of the halogen atom include fluorine, chlorine and bromine.

Preferable examples of the alkoxy which may be substituted are those having 1 to 6 carbon atoms, and typical examples thereof include methoxy, ethoxy, n-propoxy, iso-propoxy, n-butoxy, iso-butoxy and tert-butoxy.

Preferable examples of the alkylthio group which may be substituted are those having 1 to 4 carbon atoms, and typical examples thereof include methylthio, ethylthio, n-propylthio, iso-propylthio, n-butylthio and isobutylthio.

Preferable examples of the arylthio group which may be substituted are phenylthio groups which may be substituted by an alkyl group having 1 to 4 carbon atoms, and typical examples thereof include o-methylphenylthio, m-methylphenylthio, p-methylphenylthio and p-tert-butylphenylthio.

$R_3$ is a branched alkyl group having 3 to 5 carbon atoms, O-substituted oxycarbonyl group, N-substituted aminocarbonyl group in which an N-substituted group may form a ring, or substituted or unsubstituted heterocyclic ring group having two or more hetero atoms of one or more kinds selected from the group consisting of a nitrogen atom, oxygen atom and sulfur atom, and when R1 is a hydrogen atom, $R_3$ is a branched alkyl group having 3 to 5 carbon atoms, or substituted or unsubstituted heterocyclic ring group having two or more hetero atoms of one or more kinds select from the group consisting of a nitrogen atom, oxygen atom and sulfur atom.

Here, examples of the branched alkyl group having 3 to 5 carbon atoms include iso-propyl, iso-butyl, tert-butyl and iso-pentyl.

Preferable examples of the O-substituted oxycarbonyl group are those having 1 to 6 carbon atoms, and typical examples thereof include methoxycarbonyl, ethoxycarbonyl, n-propoxycarbonyl, iso-propoxycarbonyl, n-butoxycarbonyl, iso-butoxycarbonyl, tert-butoxycarbonyl, n-pentyloxycarbonyl and n-hexylcarbonyl groups.

Preferable examples of the N-substituted aminocarbonyl group are those having 1 to 10 carbon atoms, and typical examples thereof include methylaminocarbonyl, ethylaminocarbonyl, n-propylaminocarbonyl, iso-propylaminocarbonyl, n-butylaminocarbonyl, dimethyaminocarbonyl, diethylaminocarbonyl, di-n-propylaminocarbonyl, di-iso-propylaminocarbonyl and di-n-butylaminocarbonyl.

Examples of the N-substituted aminocarbonyl group which forms a ring include carboxyl groups substituted by pyrrolidinyl, piperidino, 3,5-dimethylpiperidino, morpholino, piperazino, N-methylpiperazino, N-ethylpiperazino, N-n-propylpiperazino, N-iso-propylpiperazino, N-n-butylpiperazino, N-iso-butylpiperazino, N-tert-butylpiperazino, N-methoxyethylpiperazino, N-ethoxyethylpiperazino, N-n-propoxyethylpiperazino, N-iso-propoxyethylpiperazino, N-n-butoxyethylpiperazino, N-iso-butoxyethylpiperazino and N-tert-butoxyethylpiperazino.

Preferable examples of the substituted or unsubstituted heterocyclic ring group having two or more hetero atoms of one or more kinds selected from the group consisting of a nitrogen atom, oxygen atom and sulfur atom are substituted or unsubstituted compounds having a five-membered ring or six-membered ring, and typical examples of the substituent in the ring group include alkyl groups such as methyl, ethyl, n-propyl, iso-propyl, n-butyl, iso-butyl and tert-butyl groups; alkoxy groups such as methoxy, ethoxy, n-propoxy and n-butoxy; alkylcarboxyalkyl groups such as methylcarboxymethyl, ethylcarboxymethyl, n-propylcarboxymethyl, iso-propylcarboxymethyl and n-butylcarboxymethyl; and alkoxycarboxyalkyl groups such as methoxycarboxymethyl, ethoxycarboxymethyl, n-propoxycarboxymethyl, iso-propoxycarboxymethyl and n-butoxycarboxymethyl. Typical examples of the substituted or unsubstituted compounds include oxazoline, oxazole, benzooxazole, thiazoline, thiazole, benzothiazole, imidazoline, imidazole, benzoimidazole, oxadiazole and thiadiazole.

$R_1$, $R_2$ and $R_3$ in the tautomer represented by the above-mentioned formula (1') are as defined above.

The dyestuff represented by the formula (1) can be obtained by combining 3-hydroxy-2-methyl-4-cinchonic acid with phthalic anhydride in accordance with a usual technique shown by the following reaction formula:

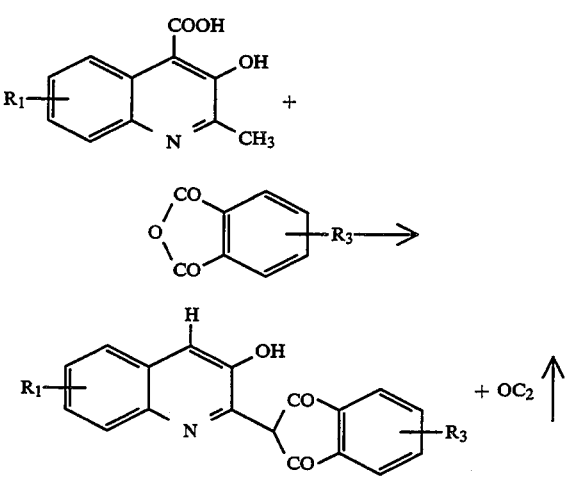

The introduction of a substituent into the 4position of the thus obtained quinaphthalone can be achieved by substituting the 4-position by a usual electrophilic reagent agent, or alternatively first substituting the 4-position by a halogen and then substituting by a usual nucleophilic reagent.

In the present invention, an ink composition for heat-sensitive transfer record can be prepared by using the dyestuff obtained by the above-mentioned method, and so the dyestuff can be fed in the state of the ink.

The preparation of the ink composition for heat-sensitive transfer record by the use of the sublimable dyestuff of the present invention can be achieved by mixing the dyestuff with a suitable resin and solvent.

In this case, the amount of the dyestuff in the ink for heat-sensitive transfer record is preferably in the range of from 2 to 7% by weight.

The resin which can be used to prepare the ink is what is used in a usual printing ink, and examples of the resin include oil resins such as rosin, phenol, xylene, petroleum, vinyl, polyamide, alkyd, nitrocellulose and alkylcellulose resins, and aqueous resins such as maleic and acrylic resins, casein, shellac and glue.

Examples of the solvent for the preparation of the ink include alcohols such as methanol, ethanol, propanol and butanol; cellosolves such as methyl cellosolve and ethyl cellosolve; aromatics such as benzene, toluene and xylene; esters such as ethyl acetate and butyl acetate; ketones such as acetone, methyl ethyl ketone and cyclohexanone; hydrocarbons such as ligroin, cyclohexane and kerosene; and dimethylformamide. In the case that the aqueous resin is used, water and a mixture of water and the above-mentioned solvent can be also used.

Examples of the base sheet which is coated with the ink include thin papers such as a condenser paper and glassine paper, and plastic films having good heat resistance such as a polyester, polyamide and polyimide. The thickness of this base sheet is suitably in the range of from 1 to 50$\mu$m in order to improve the transfer efficiency of heat from a heat-sensitive record head to the dyestuff.

The dyestuff-supporting layer on the above-mentioned base sheet can be formed by coating the base sheet with the above-mentioned ink.

In the present invention, the dyestuff-supporting layer of the transfer sheet can be fundamentally formed from the above-mentioned material, but if necessary, the dyestuff-supporting layer can contain known various additives.

The thickness of the thus formed dyestuff-supporting layer is in the range of from 0.2 to 5.0$\mu$m, preferably from 0.4 to 2.0$\mu$m, and the dyestuff in the layer is preferably present in an amount of from 5 to 70% by weight, preferably from 10 to 60% by weight based on the weight of the layer.

The transfer sheet of the present invention is sufficiently useful in a heat transfer step, even if it is not additionally treated. However, an anti-tack layer, i.e., a release layer may be formed on the dyestuff-supporting layer. The formation of such a layer prevents the transfer sheet from adhering to the material to be recorded at the time of the heat transfer and permits using a high heat transfer temperature to form an image having a remarkably excellent density.

This release layer has a considerable effect, even if it is formed only by applying an anti-tack inorganic powder. Furthermore, a the release layer comprising a resin such as a silicone polymer, acrylic polymer or fluorinated polymer having excellent releasing properties and having a thickness of from 0.01 to 5$\mu$m, preferably 0.05 to 2$\mu$m can be formed.

Even when the above-mentioned inorganic powder or the release polymer is contained in the dyestuff-supporting layer, the sufficient effect can be obtained.

Examples of the material to be recorded include fibers, fabrics, films, sheets and molded articles made of polyolefin resins such as polyethylene and polypropylene; halogenated polymers such as polyvinyl chloride and polyvinylidene chloride; vinyl polymers such as polyvinyl alcohol, polyvinyl acetate and polyacrylic ester; polyester resins such as polyethylene terephthalate and polybutylene terephthalate; polystyrene resins; polyamide resins, copolymer resins of olefins such as ethylene and propylene and other vinyl monomers; ionomers; cellulose resins such as cellulose diacetate and cellulose triacetate; polycarbonate; polysulfone and polyimide.

Particularly preferable are fabrics, sheets and films made of polyethylene terephthalate.

In addition, as the above-mentioned materials to be recorded, there can also be used papers coated and laminated with a mixture of the above-mentioned resin and acidic particles such as silica gel, papers laminated with resin films, and specific converted papers subjected to acetylation. The employment of such papers results in good record having an excellent image stability at high temperature and high humidity. Moreover, films of various resins and synthetic papers made thereof can also be used.

Additionally, in order to prevent a bad influence due to the heat of the thermal head, a heat-resistant layer may be formed on the back surface of the transfer sheet.

As the material to be recorded which can be employed to form the image by the use of the above-mentioned transfer sheet, any one can be utilized, so long as the record surface of the material has dyestuff receiving properties for the above-mentioned dyestuff. Furthermore, when a paper, metal, glass or synthetic resin which does not have the dyestuff receiving properties is used, at least one surface of such a material should be formed with a dyestuff receiving layer.

The heat transfer can be achieved by superposing the sheet upon the material to be recorded, and then heating and pressing the sheet from its back surface by means of a heat-sensitive record head, whereby the dyestuff on the sheet can be transferred onto the material to be recorded.

In carrying out the heat transfer by the use of the transfer sheet of the present invention and the above-mentioned material to be recorded, as a means for giving heat energy to the transfer sheet, there can be used any of known conventional means. For example, a recording device such as a thermal printer (e.g., Video Printer-VY-100, made by Hitachi, Ltd.) can be used to control a recording time, so that a heat energy of from 5 to 100 mj/mm$^3$ can be given, whereby the predetermined object can be sufficiently achieved.

After the transfer record step, for example, a polyester film is thermally pressed on a transfer record surface to laminate the film thereon, whereby the color development of the dyestuff can be improved and the record can be stably preserved.

With regard to the yellow sublimable dyestuff represented by the formula (1) of the present invention, the sublimation transfer amount of the dyestuff can be controlled by changing the energy given to the heat-sensitive head at the time of the heat transfer, and therefore the gradation record can be easily achieved. Thus, the yellow sublimable dyestuff is suitable for the full color record.

In addition, the yellow sublimable dyestuff is stable to heat, light, humidity and chemicals, and it does not thermally decompose during the transfer record. The shelf stability of the obtained record is also excellent.

The dyestuff of the present invention is excellent in solubility in the organic solvent and dispersion in water, and so it is easy to prepare the highly concentrated and uniformly dissolved or dispersed ink. In consequence, the record having a high color density can be obtained. It is sure that the dyestuff of the formula (1) is practically valuable.

Now, the present invention will be described in detail in reference to examples. In these examples, "part(s)" and "%" are on weight.

EXAMPLE 1

A compound represented by the formula (A) was prepared as follows.

10.2 parts of 5-tert-butylphthalic anhydride and 10.2 parts of 3-hydroxy-2-methylquinoline-4-carboxylic acid were added to 150 parts of sulfolane, and reaction was then carried out at 195° C. for 1 hour to obtain 18 parts by a compound of the formula (A).

Furthermore, by the use of the compound of the formula (A), an ink composition, a transfer sheet and a material to be recorded were prepared in accordance with the following procedures, and transfer record was then carried out.

The absorption maximum wavelength (λmax) of the compound in chloroform was 445 nm.

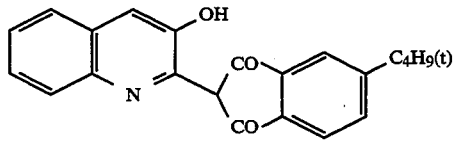

(A)

(1) Preparation of ink composition

| Dyestuff of the formula (A) | 3 parts |
| Polyvinylbutyral resin | 4.5 parts |
| Methyl ethyl ketone | 46.25 parts |
| Toluene | 46.25 parts |

The above-mentioned composition including the dyestuff was mixed for about 30 minutes with a paint conditioner by the use of glass beads to prepare an ink.

(2) Preparation of transfer sheet

The thus prepared ink was applied on a polyethylene terephthalate film having a thickness of 6μm and a back surface subjected to a heat resistance treatment by a gravure calibrator (thickness 30μm) so that the dry weight of the ink might be 1.0 g/m², and the ink was then dried.

(3) Preparation of material to be recorded

| Polyester resin (Vylon 103, made by Toyobo Co., Ltd., Tg = 47° C.) | 0.8 part |
| EVA polymeric plasticizer (Eruvaroi 741P, made by Mitsui Polychemical Co., Ltd., Tg = 37° C.) | 0.2 part |
| Amino-modified silicone | 0.04 part |

| (KF-857, made by The Sin-Etus Chemical Co., Ltd.) | |
| Epoxy-modified silicone (KF-103, made by The Sin-Etus Chemical Co., Ltd.) | 0.04 part |
| Methyl ethyl ketone/toluene/cyclohexane (weight ratio 4:4:2) | 9.0 parts |

The above-mentioned composition was mixed to form a coating solution. This coating solution was then applied onto a synthetic paper (Yupo FPG #150, made by Oji Yuka Co., Ltd.) by means of a bar coater (No. 1, made by RK. Print Cort Instruments Co., Ltd.) so that the dry weight of the coating solution might be 4.5 g/m², and it was then dried at 100° C. for 15 minutes.

(4) Transfer record

The above-mentioned transfer sheet was superposed upon the material to be recorded so that the ink-applied surface might be brought into contact with the coating solution-applied surface, and recording was then carried out under conditions of a heat-sensitive head application 10 voltage of 11 V and a printing time of 16.0 milliseconds by heating the heat transfer sheet from its back surface, thereby recording a yellow color having a color density of 2.00.

This color density was measured by the use of a densitometer RD-514 type (filter: latten No. 58) made by U.S. Macbeth Co., Ltd.

The color density was calculated in accordance with the following formula.

Color density = $\log_{10} (I_0/I)$ $I_0$ = Intensity of reflected light from a standard white reflector plate $I$ = Intensity of reflected light from a test piece.

For the obtained record, a light resistance test was made at a black panel temperature of 63±2° C. for 40 hours by the use of a xenon fade meter (made by Suga Tester Co., Ltd.). As a result, the record scarcely changed, and the stability of the image at a high temperature and a high humidity was also excellent.

The fastness of the recorded image was evaluated by allowing the image to stand in an atmosphere at 50° C. for 48 hours, and then observing the sharpness of the image and a coloring state on a white paper by which the image was rubbed. As a result, the sharpness of the image did not 10 change and the white paper was not colored, which meant that the fastness of the recorded image was good.

EXAMPLE 2

The following compound (C) was prepared by the undermentioned procedure.

21.1 parts of trimellitic anhydride were added to 285 parts of sulfolane, and the solution was then heated up to 185° C. Next, 24.6 parts of 3-hydroxy-2-methyl-6-isopropylquinoline-4-carboxylic acid were further added thereto, and reaction was then carried out at 200° C. for 1 hour to obtain 37.2 parts of a compound of the following formula (B) which was the precursor of the desired product.

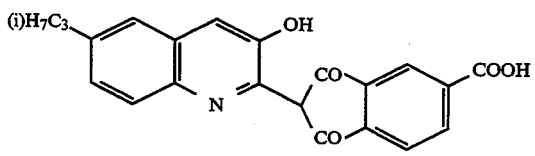

3 parts of the compound having the formula (B), 0.1 part of KI and 1.5 parts of $K_2CO_3$ were added to 50 parts of DMF, and the solution was then heated up to 80° C. Afterward, 5.4 parts of n-amyl tosylate were added thereto, and reaction was then carried out at 150° C. for 3 hours to obtain 4.2 parts of the compound represented by the formula (C). The absorption maximum wavelength (λmax) of the compound in toluene was 452 nm.

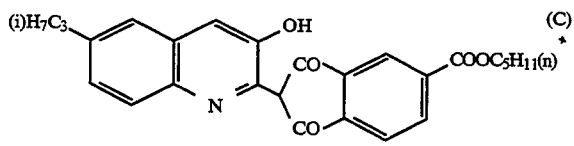

In accordance with the same procedure as in Example 1, an ink, a transfer sheet and a material to be recorded were prepared, and transfer record was then carried out, to obtain a yellow record having a color density of 1.95.

For this record, a light resistance test was made in the same manner as in Example 1, and as a result, the record scarcely changed and the stability of the image at a high temperature and a high humidity was also excellent.

For the recorded image, a fastness test was made in the same manner as in Example 1, but as a result, the sharpness of the image did not change and a white paper was not colored, which meant that the fastness of the recorded image was good.

EXAMPLE 3 to 21

In accordance with the same procedure as in Example 1, yellow dyestuffs shown in Table 1, inks, transfer sheets and materials to be recorded were prepared, and transfer record was then performed to obtain records shown in Table 1.

For these records, a light resistance test was made in the same manner as in Example 1, and as a result, the records scarcely changed, and the stability of the images at a high temperature and a high humidity was also excellent.

For these recorded images, a fastness test was made in the same manner as in Example 1, but as a result, the sharpness of the images did not change and a white paper was not colored, which meant that the fastness of the recorded images was good.

TABLE 1

| Example | Structural Formula | Maximum Optical Density | Light Resistance | Fastness of the Recorded Image |
|---|---|---|---|---|
| 3 | (i)H7C3—[quinoline-OH]—CO—[benzodioxole]—COOCH2CHC4H9(C2H5) | 1.90 | ○ | ○ |
| 4 | H3C—[quinoline-OH]—CO—[benzodioxole]—CON(C3H7(n))2 | 1.90 | ○ | ○ |
| 5 | (i)H7C3—[quinoline-OH]—CO—[benzodioxole] | 2.00 | ○ | ○ |
| 6 | [quinoline with S-tolyl (CH3), OH, CO—benzodioxole] | 1.85 | ○ | ○ |

TABLE 1-continued

| Example | Structural Formula | Maximum Optical Density | Light Resistance | Fastness of the Recorded Image |
|---|---|---|---|---|
| 7 | (i)H7C3-quinoline-OH, 2-(COO-COO)-phenyl-COOC3H7(i) | 1.90 | ○ | ○ |
| 8 | (n)H9C4-quinoline-OH, 4-S-C2H5/C2H5 CON(C2H5)2 | 1.80 | ○ | ○ |
| 9 | cyclohexyl-quinoline-OH, COO-COOC2H5 | 1.85 | ○ | ○ |
| 10 | quinoline-OH with C3H7(i), COOC4H9(i) | 1.86 | ○ | ○ |
| 11 | (t)H9C4-quinoline with S-C6H13, OH, CO-CO phenyl | 1.85 | ○ | ○ |
| 12 | (i)H7C3-quinoline-OH, COOC4H9(n) | 1.90 | ○ | ○ |
| 13 | (n)H7C3-quinoline-OH, COO-cyclohexyl | 1.90 | ○ | ○ |
| 14 | (i)H7C3-quinoline-OH, COOC4H9(i) | 1.90 | ○ | ○ |
| 15 | (i)H7C3-quinoline-OH, COOC4H9(t) | 1.90 | ○ | ○ |

TABLE 1-continued

| Example | Structural Formula | Maximum Optical Density | Light Resistance | Fastness of the Recorded Image |
| --- | --- | --- | --- | --- |
| 16 | (i)H7C3— quinoline—OH, —CO—O—C6H3—CON(C3H7(n))2 | 1.85 | ○ | ○ |
| 17 | (i)H7C3— quinoline—OH, —CO—O—C6H3—CON(C4H9(n))2 | 1.85 | ○ | ○ |
| 18 | (i)H7C3— quinoline—OH, —CO—O—C6H3—CONHC5H11(n) | 1.88 | ○ | ○ |
| 19 | (i)H7C3— quinoline—OH, —CO—O—C6H3—CONHC8H17(n) | 1.85 | ○ | ○ |
| 20 | (i)H7C3— quinoline—OH, —CO—O—C6H3—CONH—C4H9(S) | 1.76 | ○ | ○ |
| 21 | (i)H7C3— quinoline—OH, —CO—O—C6H3—C4H9(t) | 1.66 | ○ | ○ |

With regard to the evaluated results of the light resistance and the fastness of the recorded image, the good results were denoted by O and the bad results by x.

Comparative Examples 1 to 4

The results of Comparative Examples 1 to 4 are set forth in Table 2.

TABLE 2

| Comparative Example | Structural Formula | Maximum Optical Density | Light Resistance | Fastness of the Recorded Image |
| --- | --- | --- | --- | --- |
| 1 | quinoline—OH, —CO—O—C6H4 | 1.10 | ○ | ○ |
| 2 | quinoline—OH, —CO—O—C6H3—COOH | 0.70 | ○ | ○ |
| 3 | C.I. Solvent Yellow 56 | 1.75 | x | x |

TABLE 2-continued

| Comparative Example | Structural Formula | Maximum Optical Density | Light Resistance | Fastness of the Recorded Image |
|---|---|---|---|---|
| 4 | C.I. Disperse Yellow 3 | 1.65 | x | x |

○: The sharpness of the image did not change, and a white paper was not colored.
x: The image was unclear and a white paper was noticeably colored.

EXAMPLE 22 and Comparative Example 5

An ink composition of the following components was prepared and then allowed to stand a whole day and night. The thus prepared ink was applied on a polyethylene terephthalate film having a thickness of 6μm and a back surface subjected to a heat resistance treatment so that the dry weight of the ink might be 1.0 g/m², and the ink was then dried to obtain a transfer sheet.

| | |
|---|---|
| Compound (dyestuff) of (D) or (E) | 5 parts |
| Polyvinylbutyral resin | 4.5 parts |
| Methyl butyl ketone | 46.25 parts |
| Toluene | 46.25 parts |

(D)

(E)

Next, a coating solution having the following composition was applied onto (1) a synthetic paper (Yupo FPG #150, made by Oji Yuka Co., Ltd.) or (2) a transparent polyethylene terephthalate film having a thickness of 100μm as a base sheet so that the dry weight of the coating solution might be 10.0 g/m², and it was then dried at 100° C. for 30 minutes to obtain a material to be transferred.

| | |
|---|---|
| Polyester resin (Vylon 200, made by Toyobo Co., Ltd.) | 11.5 parts |
| Vinyl chloride·vinyl acetate copolymer 1000A (Denki Kagaku Kogyo K.K.) | 5.0 parts |
| Amino-modified silicone KF-393 (The Sin-Etus Chemical Co., Ltd.) | 1.2 parts |
| Epoxy-modified silicone X-22-343 (The Sin-Etus Chemical Co., Ltd.) | 1.2 parts |
| Methyl ethyl ketone/toluene/cyclohexane (weight ratio 4:4:2) | 102.0 parts |

The above-mentioned transfer sheet was superposed upon the material to be recorded so that the ink-applied surface might be brought into contact with the coating solution-applied surface, and recording was then carried out under conditions of a heat-sensitive head application voltage of 11 V in the case of the base sheet (1) and 12 V in the case of the base sheet (2) by heating the heat transfer sheet from its back surface by the use of a thermal head made by Kyoto Ceramic Co., Ltd. (KMT-85-6MPD2-HIV; resistance 500 ohm). In addition, the stability of the ink and the roughness of the transferred image were inspected. The obtained results are set forth in Table 3.

An image density was measured by the use of a transmission/reflection densitometer X-Rite 310TR (X-Rite Co., Ltd.).

The results are set forth in Table 3.

TABLE 3

| | Example 22 | Comparative Example 5 |
|---|---|---|
| Dyestuff | Compound (D) | Compound (E) |
| Base Sheet | | |
| (1) Reflective Density | 1.95 | 1.55 |
| Base Sheet | | |
| (2) Transmissive Density | 1.68 | 1.23 |
| Stability of Ink | Dyestuff was completely dissolved. | Undissolved dyestuff was deposited. |
| State of Transferred Image | Good image was obtained. | Image was soiled by dye deposited on transfer sheet, and image density deteriorated. |

EXAMPLE 23 and Comparative Example 6

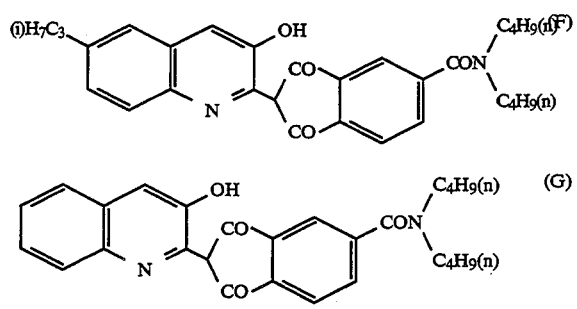

(G)

An ink composition of the following components was heated up to 70° C. to completely dissolve the same. Next, this ink was allowed to stand at room temperature (25°C.) for 48 hours, and the ink was then applied on a polyethylene terephthalate film having a thickness of 6μm and a back surface subjected to a heat resistance treatment so that the dry weight of the ink might be 1.0 g/m², and the ink was then dried to obtain a transfer sheet.

| Ink composition | |
|---|---|
| Dyestuff F (Example 23) or (Comp. Example 6) | a parts |
| Polyvinylbutyral resin (BX-1, Sekisui Chemical Co., Ltd.) | 4.5 parts |
| Toluene | (95.5-a)/2 parts |

TABLE 4

| | (Dyestuff F) (Example) | | | | |
|---|---|---|---|---|---|
| Dyestuff Conc. | Melting State of Dyestuff | Surface State of | Image Density (reflection %) | | |
| in Ink (wt %) | after Standing for 48 hours | Transfer Sheet | 3.58 mj/dot | 2.91 mj/dot | 2.01 mj/dot |
| 1.0 | Completely dissolved | Lustrous | 1.14 | 0.86 | 0.48 |
| 2.0 | Completely dissolved | Lustrous | 1.57 | 1.19 | 0.64 |
| 2.2 | Completely dissolved | Lustrous | 1.68 | 1.21 | 0.65 |
| 2.4 | Completely dissolved | Lustrous | 1.70 | 1.26 | 0.68 |
| 2.6 | Completely dissolved | Lustrous | 1.74 | 1.30 | 0.70 |
| 2.8 | Completely dissolved | Lustrous | 1.77 | 1.96 | 0.71 |
| 3.0 | Completely dissolved | Lustrous | 1.82 | 1.39 | 0.74 |
| 3.2 | Completely dissolved | Lustrous | 1.86 | 1.42 | 0.78 |
| 3.4 | Completely dissolved | Lustrous | 1.88 | 1.44 | 0.78 |
| 3.6 | Completely dissolved | Lustrous | 1.91 | 1.46 | 0.74 |
| 4.0 | Completely dissolved | Lustrous | 1.94 | 1.51 | 0.81 |
| 5.0 | Completely dissolved | Lustrous | 2.05 | 1.60 | 0.89 |
| 6.0 | Completely dissolved | Lustrous | 2.12 | 1.72 | 0.91 |
| 7.0 | Completely dissolved | Lustrous | 2.18 | 1.80 | 0.95 |

| Ink composition | |
|---|---|
| Methyl ethyl ketone | (95.5-a)/2 parts |

Next, a coating solution having the following composition was then applied onto one surface of a synthetic paper (Yupo FPG 150μm, made by Oji Yuka Co., Ltd.) as a base sheet by means of a bar coater so that the dry weight of the coating solution might be 5.0 g/m², and immediately it was simply dried by a dryer and further dried at 80° C. for 5 minutes in an oven to obtain a material to be recorded.

| | |
|---|---|
| Polyester resin (Vylon 600, made by Toyobo Co., Ltd.) | 4.0 parts |
| Vinyl chloride/vinyl acetate copolymer (#1000A, Denki Kagaku Kogyo K.K.) | 6.0 parts |
| Amino-modified silicone (X-22-8050C, The Sin-Etus Chemical Co., Ltd.) | 0.2 part |
| Epoxy-modified silicone (X-22-8000E, The Sin-Etus Chemical Co., Ltd.) | 0.2 part |
| Methyl ethyl ketone/toluene/cyclohexane (weight ratio 1/1) | 89.6 parts |

The above-mentioned transfer sheet was superposed upon the material to be recorded so that the ink-applied surface might be brought into contact with the coating solution-applied surface, and heat transfer record was then carried out under conditions of a heat-sensitive head application voltage of 10.75 V and application energies of 8.58, 2.91 and 2.01 mJ/dot by the use of a thermal head made by Kyoto Ceramic Co., Ltd. (KMT-85-6MPD2-HTV; resistance 500 ohm). The results are shown in Tables 4 and 5 as well as FIGS. 1, 2 and 3.

The dyestuff (F) could be dissolved in the ink even at a concentration of 7%, and the printing density of the transfer sheets, in which the dyestuff was used, were not saturated even under the respective application energies (8.58, 2.91 and 2.01 mJ/dot) and were liable to increase.

Furthermore, the surface state of the transfer sheets was lustrous, because the dyestuff was dissolved in the binder, and after the transfer, good images could be transferred on the materials to be recorded.

TABLE 5

| | (Dyestuff G) (Comparative Example) | | | | |
|---|---|---|---|---|---|
| Dyestuff Conc. | Dissolution of Dyestuff | Surface State of | Image Density (reflection %) | | |
| in Ink (wt %) | after Standing for 48 hours | Transfer Sheet | 3.58 mj/dot | 2.91 mj/dot | 2.01 mj/dot |
| 1.0 | Completely dissolved | Lustrous | 1.16 | 0.88 | 0.48 |
| 2.0 | Completely dissolved | Lustrous | 1.60 | 1.22 | 0.86 |
| 2.2 | Completely dissolved | Lustrous | 1.65 | 1.25 | 0.67 |
| 2.4 | Completely dissolved | Lustrous | 1.73 | 1.32 | 0.71 |
| 2.6 | Completely dissolved | Lustrous | 1.77 | 1.35 | 0.71 |
| 2.8 | Very slightly deposited | Lustrous | 1.80 | 1.40 | 0.74 |
| 3.0 | Slightly deposited | Rough | 1.71 | 1.29 | 0.69 |
| 3.2 | Abundantly deposited | Rough | 1.72 | 1.28 | 0.66 |
| 3.4 | Abundantly deposited | Rough | 1.65 | 1.22 | 0.64 |
| 3.6 | Abundantly deposited | Rough | 1.68 | 1.24 | 0.65 |
| 4.0 | Abundantly deposited | Rough | 1.57 | 1.12 | 0.57 |
| 5.0 | Abundantly deposited | Rough | 1.57 | 1.12 | 0.55 |
| 6.0 | Abundantly deposited | Rough | 1.51 | 1.06 | 0.58 |
| 7.0 | Abundantly deposited | Rough | 1.48 | 0.99 | 0.52 | the maximum image concentration was present at a dyestuff concentration of 2.8% in the ink, and when the dyestuff concentration was 8% or more, the image concentrations did not increase any more or deteriorated.

After the transfer, the image receiving sheets were soiled owing to the rough surfaces thereof.

As is apparent from the results of this comparative example, the compound (F) in which an isopropyl group was introduced into a quinoline ring of the compound (G) could be sufficiently dissolved in the ink, and therefore the high image concentrations could be obtained.

EXAMPLE 24 and Comparative Example 7

An ink composition of the following components was prepared and then allowed to stand a whole day and night. The thus prepared ink was applied on a polyethylene terephthalate film having a thickness of 6μm and a back surface subjected to a heat resistance treatment so that the dry weight of the ink might be 1.0 g/m², and the ink was then dried to obtain a transfer sheet.

| The ink composition for the transfer sheet | |
|---|---|
| Compound (dyestuff) (H: Example 24 or I: Comp. Example 7) | 5 parts |
| Vinyl chloride/vinyl acetate copolymer | 10 parts |
| Methyl ethyl ketone | 42.5 parts |
| Toluene | 42.5 parts |

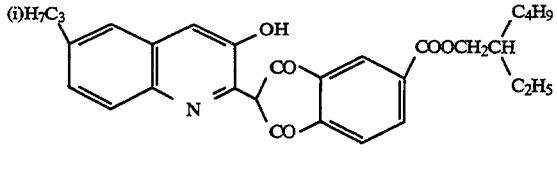

(H)

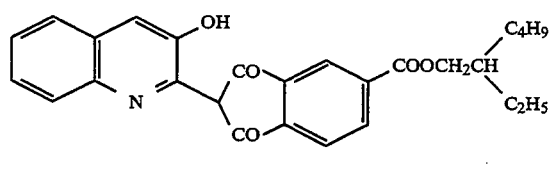

(I)

Next, a coating solution having the following composition was applied onto (1) a synthetic paper (Yupo FPG #150, made by Oji Yuka Co., Ltd.) or (2) a transparent polyethylene terephthalate film having a thickness of 100μm as a base sheet so that the dry weight of the coating solution might be 10.0 g/m², and it was then dried at 100° C. for 30 minutes to obtain a material to be transferred.

| | |
|---|---|
| Polyester resin (Vylon 200, made by Toyobo Co., Ltd.) | 11.5 parts |
| Vinyl chloride·vinyl acetate copolymer 1000A (Denki Kagaku Kogyo K.K.) | 5.0 parts |
| Amino-modified silicone KF-393 (The Sin-Etus Chemical co., Ltd.) | 1.2 parts |
| Epoxy-modified silicone X-22-343 (The Sin-Etus Chemical Co., Ltd.) | 1.2 parts |
| Methyl ethyl ketone/toluene/ cyclohexane (weight ratio 4:4:2) | 102.0 parts |

The above-mentioned transfer sheet was superposed upon the material to be recorded so that the ink-applied surface might be brought into contact with the coating solution-applied surface, and a transfer operation was then carried out under conditions of an application voltage of 11 V in the case of the base sheet (1) and 12 V in the case of the base sheet (2) by heating the transfer sheet from its back surface by the use of a thermal head made by Kyoto Ceramic Co., Ltd. (KMT-85-6MPD2-HTV; resistance 500 ohm). In addition, the stability of the ink and the roughness of the transferred image were inspected. The obtained results are set forth in Table 6.

An image density was measured by the use of a transmission/reflection densitometer X-Rite 310TR (X-Rite Co., Ltd.).

TABLE 6

| | Dyestuff | |
|---|---|---|
| | Compound (H) (Example 24) | Compound (I) (Comp. Ex. 7) |
| Base Sheet | | |
| (1) Reflective Density Base Sheet | 1.81 | 1.57 |

TABLE 6-continued

| | Dyestuff | |
|---|---|---|
| | Compound (H) (Example 24) | Compound (I) (Comp. Ex. 7) |
| (2) Transmissive Density | 1.01 | 0.70 |
| Stability of Ink | Dyestuff was completely dissolved. | Undissolved dyestuff was precipitated. Amount of precipitated dyestuff was 55% of initial feed. |
| State of Transferred Image | Good image was obtained. | Image was soiled with precipitated dyestuff, and image density deteriorated. |

EXAMPLE 25

A compound represented by the following formula (K) was prepared by the undermentioned procedure.

53.8 parts of trimellitic anhydride and 50.8 parts of 3-hydroxy-2-methylquinoline-4-carboxylic acid were added to 538 parts of sulfolane, and reaction was then carried out at 200° C. for 1 hour to obtain 68 parts of a compound of the following formula (J) which was the precursor of the desired product.

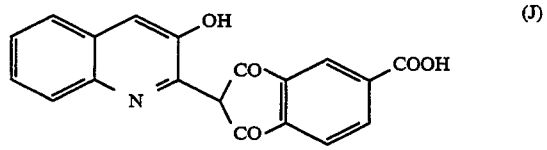

(J)

10 parts of the compound having the formula (J) and 0.4 part of pyridine were added to 60 parts of o-dichlorobenzene, and the solution was then heated up to 100° C. Afterward, 7.2 parts of thionyl chloride were added thereto, and reaction was then carried out at 100° C. for 2 hours. Afterward, excessive thionyl chloride was removed at 100° C. under reduced pressure, and 3.4 parts of 3-amino-2-propanol were added, followed by reaction at 100° C. for 1 hour. Furthermore, the solution was heated up to 170° C., and reaction was then carried out for 7 hours to obtain 9.5 parts of the compound represented by the formula (K). The absorption maximum wavelength (λmax) of this compound in toluene was 448 nm.

(K)

(1) Preparation of ink composition

| | |
|---|---|
| Dyestuff of the formula (K) | 3 parts |
| Polyvinylbutyral resin | 4.5 parts |
| Methyl ethyl ketone | 46.25 parts |
| Toluene | 46.25 parts |

The above-mentioned composition including the dyestuff was mixed for about 30 minutes with a paint conditioner by the use of glass beads to prepare an ink.

(2) Preparation of transfer sheet

The thus prepared ink was applied on a polyethylene terephthalate film having a thickness of 6μm and a back surface subjected to a heat resistance treatment by a gravure calibrator (thickness 30μm) so that the dry weight of the ink might be 1.0 g/m², and the ink was then dried.

(3) Preparation of material to be recorded

| | |
|---|---|
| Polyester resin (Vylon 103, made by Toyobo Co., Ltd., Tg = 47° C.) | 0.8 part |
| EVA polymeric plasticizer (Eruvaroi 741p, made by Mitsui Polychemical Co., Ltd., Tg = 37° C.) | 0.2 part |
| Amino-modified silicone (KF-857, made by The Sin-Etus Chemical Co., Ltd.) | 0.04 part |
| Epoxy-modified silicone (KF-103, made by The Sin-Etus Chemical Co., Ltd.) | 0.04 part |
| Methyl ethyl ketone/toluene/cyclohexane (weight ratio 4:4:2) | 9.0 parts |

The above-mentioned composition was mixed to form a coating solution. This coating solution was then applied onto a synthetic paper (Yupo FPG #150, made by Oji Yuka Co., Ltd.) by means of a bar coater (No. 1, made by RK. Print Cort Instruments Co., Ltd.) so that the dry weight of the coating solution might be 4.5 g/m², and it was then dried at 100° C. for 15 minutes.

(4) Transfer record

The above-mentioned transfer sheet was superposed upon the material to be recorded so that the ink-applied surface might be brought into contact with the coating solution-applied surface, and a transfer operation was then carried out under conditions of a heat-sensitive head application voltage of 11 V and a printing time of 16.0 milliseconds by heating the heat transfer sheet from its back surface, thereby recording a yellow color having a color density of 1.95.

This color density was measured by the use of a densitometer RD-514 type (filter: latten No. 58) made by U.S. Macbeth Co., Ltd.

The color density was calculated in accordance with the following formula.

Color density = log₁₀(I₀/I)

I₀ = Intensity of reflected light from a standard white reflector plate

I = Intensity of reflected light from a test piece.

For the obtained record, a light resistance test was made at a black panel temperature of 63±2° C. for 40 hours by the use of a xenon fade meter (made by Suga Tester Co., Ltd.). As a result, the record scarcely changed, and the stability of the image at a high temperature and a high humidity was also excellent.

The fastness of the recorded image was evaluated by allowing the image to stand in an atmosphere at 50° C. for 48 hours, and then observing the sharpness of the image and a coloring state on a white paper by which the image was rubbed. As a result, the sharpness of the image did not change and the white paper was not colored, which meant that the fastness of the recorded image was good.

EXAMPLE 26

A compound represented by the formula (L) was prepared as follows.

10 parts of a compound having the formula (J) and 0.4 part of pyridine were added to 50 parts of nitrobenzene, and the solution was then heated up to 100° C. Afterward, 7.2 parts of thionyl chloride were added thereto, and reaction was then carried out at 100° C. for 2 hours. Afterward, excessive thionyl chloride was removed at 100° C. under reduced pressure, and 4.6 parts of isopropylcarbonylhydrazine were added, followed by reaction for 1 hour. Next, 14.3 parts of thionyl chloride were further added, and the solution was then heated up to 130° C. and reaction was carried out for 4 hours to obtain 7.9 parts of a compound represented by the formula (L). The absorption maximum wavelength (λmax) of this compound in toluene was 446 nm.

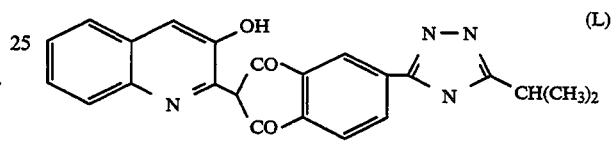

In accordance with the same procedures as in Example 25, an ink, a transfer sheet and a material to be recorded were prepared, and transfer record was then carried out to obtain a yellow record having a color density of 1.80.

For this record, a light resistance test was made in the same manner as in Example 25, and as a result, the record scarcely changed and the stability of the image at a high temperature and a high humidity was also excellent.

For the recorded image, a fastness test was made in the same manner as in Example 25, but as a result, the sharpness of the image did not change and a white paper was not colored, which meant that the fastness of the recorded image was good.

EXAMPLES 27 to 48

In accordance with the same procedure as in Example 25 or 26, yellow dyestuffs shown in Table 7, inks, transfer sheets and materials to be recorded were prepared, and transfer record was then performed to obtain records shown in Table 7.

For these records, a light resistance test was made in the same manner as in Example 25, and as a result, the records scarcely changed, and the stability of the images at a high temperature and a high humidity was also excellent.

For the recorded images, a fastness test was made in the same manner as in Example 25, but as a result, the sharpness of the images did not change and a white paper was not colored, which meant that the fastness of the recorded images was good.

The measured results of the maximum transfer concentration, and the evaluated results of the light resistance and the fastness of the recorded image are set forth in Table 7.

TABLE 7

| Example | Structural Formula | Maximum Optical Density | Light Resistance | Fastness of the Recorded Image |
|---|---|---|---|---|
| 27 | | 1.85 | ○ | ○ |
| 28 | | 1.90 | ○ | ○ |
| 29 | | 1.92 | ○ | ○ |
| 30 | | 1.90 | ○ | ○ |
| 31 | | 1.80 | ○ | ○ |
| 32 | | 1.85 | ○ | ○ |
| 33 | | 1.90 | ○ | ○ |
| 34 | | 1.85 | ○ | ○ |

TABLE 7-continued

| Example | Structural Formula | Maximum Optical Density | Light Resistance | Fastness of the Recorded Image |
|---|---|---|---|---|
| 35 | (i)H7C3- quinoline-OH, CO-CO-benzene-thiadiazole-CH(CH3)2 | 1.92 | ○ | ○ |
| 36 | quinoline-OH, CO-CO-benzene-oxazoline with CH2OCOCH3, CH2OCOCH3 | 1.90 | ○ | ○ |
| 37 | quinoline-OC(CH3)3, OH, CO-CO-benzene-oxazole | 1.80 | ○ | ○ |
| 38 | quinoline-OH, CO-CO-benzene-oxazoline with C2H5, CH2OCOC(CH3)3 | 1.85 | ○ | ○ |
| 39 | quinoline-OH, CO-CO-benzene-benzothiazole | 1.85 | ○ | ○ |
| 40 | quinoline-OH, CO-CO-benzene-oxazoline with C2H5, C6H13 | 1.84 | ○ | ○ |
| 41 | (i)H7C3- quinoline-OH, CO-CO-benzene-benzoxazole-CH3 | 1.85 | ○ | ○ |
| 42 | quinoline-OC3H6OC2H5, OH, CO-CO-benzene-oxazoline-CH3 | 1.90 | ○ | ○ |

TABLE 7-continued

| Example | Structural Formula | Maximum Optical Density | Light Resistance | Fastness of the Recorded Image |
| --- | --- | --- | --- | --- |
| 43 | (structure with cyclohexyl-quinoline, OH, CO-O, phenyl, oxazoline with C$_2$H$_5$ and CH$_2$OCOCH(CH$_3$)$_2$) | 1.85 | ○ | ○ |
| 44 | (t)H$_9$C$_4$-quinoline-OH, CO-O, phenyl, oxazoline with CH$_3$ | 1.90 | ○ | ○ |
| 45 | (n)H$_{17}$C$_8$-quinoline-OH, CO-O, phenyl, oxazoline with CH$_3$ | 1.88 | ○ | ○ |
| 46 | (i)H$_7$C$_3$-quinoline-OH, CO-O, phenyl, oxazoline with C$_2$H$_5$ and CH$_2$OCOCH$_3$ | 1.91 | ○ | ○ |
| 47 | (i)H$_7$C$_3$-quinoline-OH, CO-O, phenyl, oxazoline with C$_2$H$_5$ and CH$_2$OCOCH(CH$_3$)$_2$ | 1.95 | ○ | ○ |
| 48 | (i)H$_7$C$_3$-quinoline-OH, CO-O, phenyl, oxazoline with CH$_2$OCOCH$_3$ and CH$_2$OCOCH$_3$ | 1.90 | ○ | ○ |

With regard to the evaluated results of the light resistance and the fastness of the recorded image, the good results were denoted by O and the bad results by x.

Comparative Examples 8 to 11

Inks, transfer sheets and materials to be recorded were prepared in accordance with the same procedure as in Example 25 by the use of yellow dyestuffs shown in Table 8, and transfer record was then carried out. Furthermore, a light resistance test and a fastness test were also carried out in the same manner as in Example 25. As a result, products which could simultaneously meet the requirements of the maximum transfer density, the light resistance and the fastness of the recorded image could not be obtained, and images were unclear and white paper were noticeably colored, which meant that these products were poor.

TABLE 8
(Comparative Examples)

| Example | Structural Formula | Maximum Optical Density | Light Resistance | Fastness of the Recorded Image |
|---|---|---|---|---|
| 8 | (structure with Br, OH, quinoline, CO-CO) | 1.0 | o | o |
| 9 | (structure with OH, quinoline, CO-CO, COOH) | 0.1 | o | o |
| 10 | C.I. Solvent Yellow-56 | 1.75 | x | x |
| 11 | C.I. Disperse Yellow-3 | 1.65 | x | x |

With regard to the evaluated results of the light resistance and the fastness of the recorded image, the good results were denoted by O and the bad results by x.

EXAMPLE 49

A compound represented by the following formula (M) was prepared by the undermentioned procedure.

10 parts of the compound having the formula (B) and 0.4 part of pyridine were added to 60 parts of o-dichlorobenzene, and the solution was then heated up to 100° C. Afterward, 7.2 parts of thionyl chloride were added thereto, and reaction was then carried out at 100° C. for 2 hours. Afterward, excessive thionyl chloride was removed at 100° C. under reduced pressure, and 10.4 parts of morpholine were added, followed by reaction at 100° C. for 2 hours, to obtain 10.5 parts of the compound represented by the formula (M). The absorption maximum wavelength (λmax) of this compound in toluene was 446 nm.

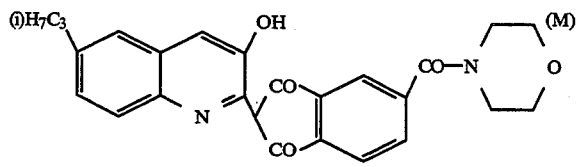

(1) Preparation of ink

| Dyestuff of the formula (M) | 3 parts |
|---|---|
| Polyvinylbutyral resin | 4.5 parts |
| Methyl ethyl ketone | 46.25 parts |
| Toluene | 46.25 parts |

The above-mentioned composition including the dyestuff was mixed for about 30 minutes with a paint conditioner by the use of glass beads to prepare an ink.

(2) Preparation of transfer sheet

The thus prepared ink was applied on a polyethylene terephthalate film having a thickness of 9μm and a back surface subjected to a heat resistance treatment by a gravure calibrator (thickness 30μm) so that the dry weight of the ink might be 1.0 g/m², and the ink was then dried.

(3) Preparation of material to be recorded

| Polyester resin (Vylon 103, made by Toyobo Co., Ltd., Tg = 47° C.) | 0.8 part |
|---|---|
| EVA polymeric plasticizer (Eruvaroi 741p, made by Mitsui Polychemical Co., Ltd., Tg = 37° C.) | 0.2 part |
| Amino-modified silicone KF-857, made by The Sin-Etus Chemical Co., Ltd.) | 0.04 part |
| Epoxy-modified silicone (KF-103, made by The Sin-Etus Chemical Co., Ltd.) | 0.04 part |
| Methyl ethyl ketone/toluene/cyclohexane (weight ratio 4:4:2) | 9.0 parts |

The above-mentioned composition was mixed to form a coating solution. This coating solution was then applied onto a synthetic paper (Yupo FPG #150, made by Oji Yuka Co., Ltd.) by means of a bar coater (No. 1, made by RK. Print Cort Instruments Co., Ltd.) so that the dry weight of the coating solution might be 4.5 g/m², and it was then dried at 100° C. for 15 minutes.

(4) Transfer record

The above-mentioned transfer sheet was superposed upon the material to be recorded so that the ink-applied surface might be brought into contact with the coating solution-applied surface, and a transfer operation was then carried out under conditions of a heat-sensitive head application voltage of 11 V and a printing time of 16.0 milliseconds by heating the heat transfer sheet from its back surface, thereby recording a yellow color having a color density of 1.95.

This color density was measured by the use of a densitometer RD-514 type (filter: latten No. 58) made by U.S. Macbeth Co., Ltd.

The color-density was calculated in accordance with the following formula.

Color density = $\log_{10}(I_0/I)$ $I_0$ = Intensity of reflected light from a standard white reflector plate I = Intensity of reflected light from a test piece.

For the obtained record, a light resistance test was made at a black panel temperature of 63±2° C. for 40 hours by the use of a xenon fade meter (made by Suga Tester Co., Ltd. ). As a result, the record scarcely changed, and the stability of the image at a high temperature and a high humidity was also excellent.

The fastness of the recorded image was evaluated by allowing the image to stand in an atmosphere at 50° C. for 48 hours, and then observing the sharpness of the image and a coloring state on a white paper by which the image was rubbed. As a result, the sharpness of the image did not change and the white paper was not colored, which meant that the fastness of the recorded image was good.

EXAMPLE 50

A compound represented by the formula (O) was prepared as follows.

10 parts of a compound having the formula (B) and 0.4 part of pyridine were added to 60 parts of o-dichlorobenzene, and the solution was then heated up to 100° C. Next, 7.2 parts of thionyl chloride were added thereto, and reaction was then carried out at 100° C. for 2 hours. Afterward, excessive thionyl chloride was removed at 100° C. under reduced pressure to obtain 10 parts of a compound of the following formula (N) which was the precursor of the desired product (O).

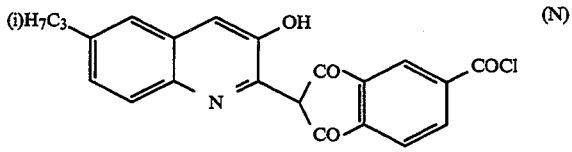

Next, 7.7 parts of piperazine were added to 40 parts of pyridine, and the solution was then heated up to 80° C. 10 parts of the compound of the formula (N) were then added thereto, and reaction was carried out at 80° C. for 3 hours to obtain 11 parts of the compound represented by the formula (O). The absorption maximum wavelength ($\lambda$max) of this compound in toluene was 445 nm.

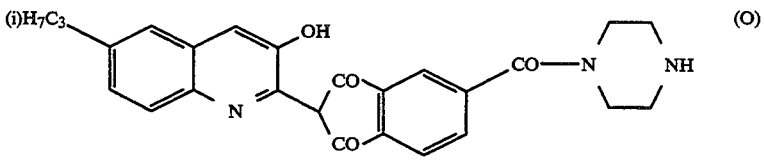

In accordance with the same procedures as in Example 49, an ink, a transfer sheet and a material to be recorded were prepared, and transfer record was then carried out, to obtain a yellow record having a color density of 1.80.

For this record, a light resistance test was made in the same manner as in Example 49, and as a result, the record scarcely changed and the stability of the image at a high temperature and a high humidity was also excellent.

For the recorded image, a fastness test was made in the same manner as in Example 49, but as a result, the sharpness of the image did not change and a white paper was not colored, which meant that the fastness of the recorded image was good.

EXAMPLE 51

A compound represented by the formula (P) was prepared as follows.

5 parts of a compound having the formula (O) and 0.9 part of potassium carbonate were added to 40 parts of N,N-dimethylformamide, and the solution was then heated up to 70° C. Next, 5.7 parts of n-butyl tosylate were added thereto, and reaction was then carried out at 70° C. for 3 hours to obtain 5.5 parts of a compound of the following formula (P). The absorption maximum wavelength ($\lambda$max) of this compound in toluene was 448 nm.

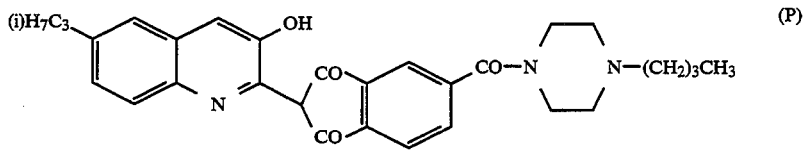

In accordance with the same procedures as in Example 49, an ink, a transfer sheet and a material to be recorded were prepared, and transfer record was then carried out, to obtain a yellow record having a color density of 1.95.

For this record, a light resistance test was made in the same manner as in Example 49, and as a result, the record scarcely changed and the stability of the image at a high temperature and a high humidity was also excellent.

For the recorded image, a fastness test was made in the same manner as in Example 49, but as a result, the sharpness of the image did not change and a white paper was not colored, which meant that the fastness of the recorded image was good.

EXAMPLES 52 to 68

In accordance with the same procedure as in Example 49, 50 or 51, yellow dyestuffs shown in Table 9, inks, transfer sheets and materials to be recorded were prepared, and transfer record was then performed to obtain records shown in Table 9.

For these records, a light resistance test was made in the same manner as in Example 49, and as a result, the records scarcely changed, and the stability of the images at a high temperature and a high humidity was also excellent.

For the recorded images, a fastness test was made in the same manner as in Example 49, but as a result, the sharpness of the images did not change and a white paper was not colored, which meant that the fastness of the recorded images was good.

The measured results of the maximum transfer concentration, and evaluated results of light resistance and fastness of the recorded image are set forth in Table 9.

TABLE 9

| Example | Structural Formula | Maximum Optical Density | Light Resistance | Fastness of the Recorded Image |
|---|---|---|---|---|
| 52 | (structure) | 1.90 | ○ | ○ |
| 53 | (structure) | 1.90 | ○ | ○ |
| 54 | (structure) | 1.92 | ○ | ○ |
| 55 | (structure) | 1.90 | ○ | ○ |
| 56 | (structure) | 1.90 | ○ | ○ |
| 57 | (structure) | 1.75 | ○ | ○ |
| 58 | (structure) | 1.90 | ○ | ○ |
| 59 | (structure) | 1.85 | ○ | ○ |

TABLE 9-continued

| Example | Structural Formula | Maximum Optical Density | Light Resistance | Fastness of the Recorded Image |
|---|---|---|---|---|
| 60 | (structure with $H_3C$-, $OC_2H_4OCH_3$, OH, quinoline, piperazine-NH) | 1.80 | ○ | ○ |
| 61 | (structure with $H_3C$-phenyl-S-, $H_3C$-quinoline, OH, morpholine) | 1.85 | ○ | ○ |
| 62 | (structure with (i)$H_7C_3$-, OH, quinoline, 3,5-dimethylpiperidine) | 1.90 | ○ | ○ |
| 63 | (structure with (i)$H_7C_3$-, OH, quinoline, piperidine) | 1.88 | ○ | ○ |
| 64 | (structure with (i)$H_7C_3$-, OH, quinoline, piperazine-$C_4H_9$(i)) | 1.93 | ○ | ○ |
| 65 | (structure with (i)$H_7C_3$-, OH, quinoline, piperazine-$C_8H_{17}$(n)) | 1.91 | ○ | ○ |
| 66 | (structure with (i)$H_7C_3$-, OH, quinoline, piperazine-$C_2H_4OC_3H_7$) | 1.89 | ○ | ○ |
| 67 | (structure with (i)$H_7C_3$-, $H_{13}C_6$-S-, OH, quinoline, piperidine) | 1.85 | ○ | ○ |

TABLE 9-continued

| Example | Structural Formula | Maximum Optical Density | Light Resistance | Fastness of the Recorded Image |
|---|---|---|---|---|
| 68 | (i)H7C3— [quinoline with OC3H6OC2H5, OH, and CO—N(piperazine)N—C4H9(n) substituents] | 1.88 | o | o |

With regard to the evaluated results of the light resistance and the fastness of the recorded image, the good results were denoted by O and the bad results by x.

Comparative Examples 12 to 14

Inks, transfer sheets and materials to be recorded were prepared in accordance with the same procedure as in Example 49 by the use of yellow dyestuffs shown in Table 10, and transfer record was then carried out. Furthermore, a light resistance test and a fastness test were also performed in the same manner as in Example 49. As a result, products which could simultaneously meet the requirements of the maximum transfer density, the light resistance and the fastness could not be obtained, and images were unclear and white papers were noticeably colored, which meant that these products were poor.

TABLE 10

| Example | Structural Formula | Maximum Optical Density | Light(*) Resistance | Fastness of the Recorded Image |
|---|---|---|---|---|
| 12 | [quinoline with OH and COOCH3 substituents] | 1.2 | o | o |
| 13 | C.I. Disperse Yellow-3 | 1.65 | x | x |
| 14 | C.I. Solvent Yellow-56 | 1.75 | x | x |

(*)With regard to the evaluated results of the light resistance and the fastness of the recorded image, the good results were denoted by o and the bad results by x.

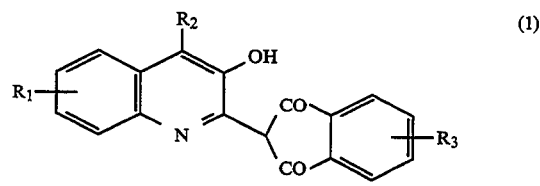

What is claimed is:

1. A dyestuff for heat-sensitive transfer record represented by the formula (1)

where $R_1$ is an alkyl group having 1 to 8 carbon atoms or cycloalkyl group; $R_2$ is a hydrogen atom, halogen atom, alkoxy group which may be substituted, alkylthio group which may be substituted or arylthio group which may be substituted; and $R_3$ is a dialkylaminocarbonyl group.

2. The dyestuff for heat-sensitive transfer record according to claim 1 wherein $R_1$ is a branched alkyl group having 3 to 5 carbon atoms.

3. The dyestuff for heat-sensitive transfer record according to claim 1 wherein $R_1$ is an isopropyl group.

4. The dyestuff for heat-sensitive transfer record according to claim 2 wherein $R_2$ is a hydrogen atom.

5. The dyestuff for heat-sensitive transfer record according to claim 1 wherein $R_1$ is an isopropyl group, $R_2$ is a hydrogen atom, and $R_3$ is a dialkylaminocarbonyl group.

6. The dyestuff of claim 1 which is present as a tautomer represented by the following formula:

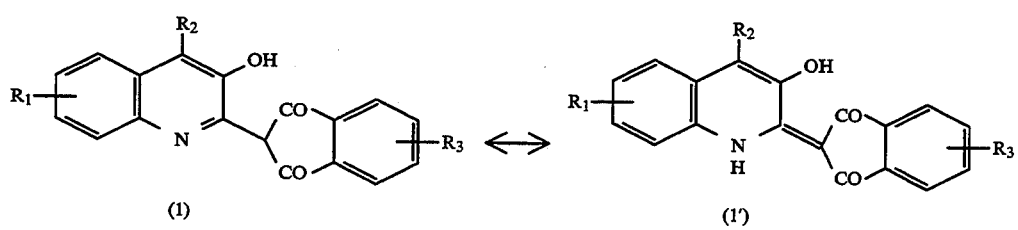

wherein $R_1$, $R_2$ and $R_3$ have the meanings given in claim 1.

7. The dyestuff of claim 1, wherein $R_1$ is an alkyl group of 1-8 carbon atoms or a cycloalkyl group of 5 to 6 carbon atoms, $R_2$ is a hydrogen atom, a halogen atom, an alkoxy group of 1 to 6 carbon atoms optionally substituted by an alkoxy group of 1 or 2 carbon atoms, an alkylthio group of 1 to 4 carbon atoms or a phenylthio group optionally substituted by an alkyl group of 1 to 4 carbon atoms and $R_3$ is a dialkylaminocarbonyl group of up to 10 carbon atoms.

8. The dyestuff of claim 1, wherein $R_3$ is dimethylaminocarbonyl, diethylaminocarbonyl, di-n-propylaminocarbonyl, di-iso-propylaminocarbonyl or di-n-butylaminocarbonyl.

9. An ink composition for heat-sensitive transfer record which comprises a dyestuff for heat-sensitive transfer record represented by the formula (1) in claim 1, a binder resin, and an organic solvent and/or water.

* * * * *